US011192625B2

(12) United States Patent
Poloni et al.

(10) Patent No.: US 11,192,625 B2
(45) Date of Patent: Dec. 7, 2021

(54) PANELS FOR OBSTRUCTING AIR FLOW THROUGH APERTURES IN AN AIRCRAFT WING

(71) Applicant: BOMBARDIER INC., Dorval (CA)

(72) Inventors: Matthew Poloni, Toronto (CA); Julien Lardy, Dollard-des-Ormeaux (CA); Jeffrey Massey, Somerset (GB); Faris Jasem, Laval (CA)

(73) Assignee: BOMBARDIER INC., Dorval (CA)

( * ) Notice: Subject to any disclaimer, the term of this patent is extended or adjusted under 35 U.S.C. 154(b) by 318 days.

(21) Appl. No.: 16/309,290

(22) PCT Filed: Jun. 9, 2017

(86) PCT No.: PCT/IB2017/053435
§ 371 (c)(1),
(2) Date: Dec. 12, 2018

(87) PCT Pub. No.: WO2017/216691
PCT Pub. Date: Dec. 21, 2017

(65) Prior Publication Data
US 2019/0176959 A1 Jun. 13, 2019

Related U.S. Application Data

(60) Provisional application No. 62/351,555, filed on Jun. 17, 2016.

(51) Int. Cl.
*B64C 3/26* (2006.01)
*B64C 9/02* (2006.01)
(Continued)

(52) U.S. Cl.
CPC ............. *B64C 3/26* (2013.01); *B64C 7/00* (2013.01); *B64C 9/02* (2013.01); *B64C 9/14* (2013.01); *B64D 15/04* (2013.01); *Y02T 50/30* (2013.01)

(58) Field of Classification Search
CPC .... B64C 3/26; B64C 7/00; B64C 9/02; B64C 9/14; B64C 2009/143; B64D 15/04; Y02T 50/30
See application file for complete search history.

(56) References Cited

U.S. PATENT DOCUMENTS 4,640,477 A  2/1987 Pace
4,848,707 A  7/1989 Britton
(Continued)

FOREIGN PATENT DOCUMENTS

EP  2208669 A2  7/2010
EP  2604512 A2  6/2013
(Continued)

OTHER PUBLICATIONS

PCT International Search Report and Written Opinion dated Sep. 18, 2017, re: International Application No. PCT/IB2017/053435.

*Primary Examiner* — Rodney A Bonnette
(74) *Attorney, Agent, or Firm* — Norton Rose Fulbright Canada LLP

(57) ABSTRACT

Apparatus for improving flow characteristics around aircraft wings by obstructing air flow through an aperture formed in a wing skin for a movable duct or track are disclosed. In one embodiment, the apparatus comprises a substantially rigid panel movable at least partially across the aperture for at least partially occluding the aperture and for accommodating movement of a slat track extending through the aperture. In another embodiment, the apparatus comprises a hinged panel configured to swing outwardly from an outer side of the wing skin toward an open position to accommodate movement of an anti-icing duct extending through the aperture and to swing toward a closed position at least partially occluding the aperture.

24 Claims, 7 Drawing Sheets

(51) Int. Cl.
*B64D 15/04* (2006.01)
*B64C 9/14* (2006.01)
*B64C 7/00* (2006.01)

(56) References Cited

U.S. PATENT DOCUMENTS

| | | | |
|---|---|---|---|
| 4,880,189 A | 11/1989 | Day | |
| 5,044,580 A * | 9/1991 | Williams | B64C 7/00 |
| | | | 244/214 |
| 2011/0174933 A1 | 7/2011 | Blades | |
| 2013/0153713 A1* | 6/2013 | Wilson | B64D 15/12 |
| | | | 244/214 |
| 2013/0214096 A1* | 8/2013 | Wilson | B64C 9/02 |
| | | | 244/213 |
| 2019/0337606 A1* | 11/2019 | Kurikesu | B64C 29/0033 |
| 2020/0377195 A1* | 12/2020 | Dovey | B64C 9/323 |

FOREIGN PATENT DOCUMENTS

| | | |
|---|---|---|
| WO | 2012063046 A1 | 5/2012 |
| WO | 2016027187 A1 | 2/2016 |
| WO | 2016125094 A1 | 8/2016 |

\* cited by examiner

PANELS FOR OBSTRUCTING AIR FLOW THROUGH APERTURES IN AN AIRCRAFT WING

CROSS-REFERENCE TO RELATED APPLICATION(S)

The present application is a national phase application under 35 U.S.C. 371 of International Patent Application No. PCT/IB2017/053435 filed on Jun. 9, 2017, which claims priority from U.S. Provisional Patent Application Ser. No. 62/351,555 filed on Jun. 17, 2016, the entire content of which is hereby incorporated by reference.

TECHNICAL FIELD

The disclosure relates generally to improving air flow characteristics around aircraft wings and, more particularly, to obstructing air flow through an aperture formed in a wing skin for a movable duct or track.

BACKGROUND OF THE ART

Fixed-wing aircraft typically have deployable high lift devices such as trailing edge flaps and leading edge slats that are used to increase the lift coefficient of the wing for take-off and landing. Some fixed-wing aircraft also have ice protection systems that are designed to prevent ice from accumulating on aerodynamic surfaces during flight. Such ice protection systems can include anti-icing systems such as bleed air systems that are intended to keep aerodynamic surfaces above the freezing temperature required for ice to accumulate. In a bleed air system, hot air is "bled" off the aircraft engine and routed through the aircraft structure for delivery to the desired aerodynamic surface(s). With respect to leading edge slats, the hot air can be delivered through one or more ducts that extend between the fixed structure of the wing and the leading edge slats through one or more respective apertures formed in the skin of the wing. The ducts can be configured to (e.g., by rotation and/or in a telescoping manner) accommodate movement of the leading edge slat relative to the fixed structure of the wing.

High lift devices such as leading edge slats can be deployed and retracted via movable tracks that movably connect the high lift devices to a fixed portion of the wing. In some situations the tracks are movable relative to the fixed wing portion and are partially received into the fixed wing portion. Accordingly, such movable tracks can also extend through apertures formed in the wing skin of the fixed wing portion.

The air passages provided by such apertures in the wing skin can lead to undesirable flow characteristics around the wing leading edge region due to leakage flow through the apertures from the high pressure lower wing surface to the low pressure upper wing surface.

SUMMARY

In one aspect, the disclosure describes an apparatus for obstructing air flow through an aperture in an aircraft wing skin where a movable member extends through the aperture. The apparatus comprises:

a substantially rigid panel configured to be movable at least partially across the aperture for at least partially occluding the aperture and for accommodating movement of the movable member extending through the aperture; and a first guide attached to the rigid panel and configured to engage a first track configured to direct a movement of the rigid panel at least partially across the aperture.

The apparatus may comprise an interfacing surface for contacting the movable member and permitting the movable member to urge the rigid panel toward an open position.

The apparatus may comprise a biasing member configured to partially resist the urging of the rigid panel by the movable member.

The apparatus may comprise a biasing member configured to resiliently bias the rigid panel toward a closed position.

The apparatus may comprise a second guide attached to the rigid panel and configured to engage a second track configured to direct the movement of the rigid panel at least partially across the aperture.

In another aspect, the disclosure describes an aircraft wing assembly comprising:

a fixed wing portion comprising a wing skin, the wing skin having an aperture formed therein;

a movable member extending through the aperture formed in the wing skin, the movable member extending between the fixed wing portion and an aerodynamic device movably connected to the fixed wing portion;

a substantially rigid panel movable at least partially across the aperture formed in the wing skin for at least partially occluding the aperture and for accommodating movement of the movable member extending through the aperture;

a first guide attached to the rigid panel; and a first track for directing a movement of the rigid panel at least partially across the aperture, the first track being engaged with the first guide.

The fixed wing portion may comprise a first rib adjacent the rigid panel, and a motion path of the rigid panel may be substantially parallel to the first rib.

The first track may be disposed on the first rib of the fixed wing portion.

The first track may comprise a first slot.

The assembly may comprise: a second guide attached to the rigid panel; and a second track for directing the movement of the rigid panel at least partially across the aperture, the first track being engaged with the second guide and being disposed on the first rib of the fixed wing portion.

The second track may comprise a second slot.

A path defined by the second track may be non-linear. The path defined by the second track may be substantially arcuate.

The second track may be disposed aft of the first track relative to the first rib.

A path defined by the first track may be substantially linear.

The first rib may be adjacent a first side of the rigid panel. The fixed wing portion may comprise a second rib adjacent a second side of the rigid panel that is laterally opposite the first side of the rigid panel, the second rib being substantially parallel to the first rib.

The assembly may comprise: a third guide attached to the rigid panel and engaged with a third track; and a fourth guide attached to the rigid panel and engaged with a fourth track where the third track and the fourth track are disposed on the second rib of the fixed wing portion.

The third track may comprise a third slot and the fourth track may comprise a fourth slot.

A path defined by the third track may be substantially linear and a path defined by the fourth track may be non-linear.

The fourth track may be disposed aft of the third track relative to the second rib.

The movable member may be configured to urge the rigid panel toward an open position.

The assembly may comprise a biasing member configured to partially resist the urging of the rigid panel by the movable member.

The assembly may comprise a biasing member configured to resiliently bias the rigid panel toward a closed position.

The movable member may comprise a slat track.

In another aspect, the disclosure describes an apparatus for obstructing air flow through an aperture in an aircraft wing skin where a movable member extends through the aperture. The apparatus comprises: a hinged panel configured to swing outwardly from an outer side of the wing skin toward an open position and to swing toward a closed position at least partially occluding the aperture, the movement of the hinged panel being configured to accommodate movement of the movable member extending through the aperture.

The apparatus may comprise an interfacing surface for contacting the movable member and permitting the movable member to urge the hinged panel toward the open position.

The apparatus may comprise a biasing member configured to resiliently bias the hinged panel toward the movable member.

The apparatus may comprise a resilient biasing member connected to the hinged panel and to the movable member.

The apparatus may comprise a biasing member configured to resiliently bias the hinged panel toward the closed position.

The apparatus may comprise a seating surface for interfacing with the hinged panel when the hinged panel is in the closed position.

The seating surface may be configured to support the hinged panel at a position where an outer side of the hinged panel is substantially flush with the outer side of the wing skin.

In another aspect, the disclosure describes an aircraft wing assembly comprising:

a fixed wing portion comprising a wing skin, the wing skin having an aperture formed therein;

a movable member extending through the aperture formed in the wing skin, the movable member extending between the fixed wing portion and an aerodynamic device movably connected to the fixed wing portion; and a hinged panel configured to swing outwardly from an outer side of the wing skin toward an open position and to swing toward a closed position at least partially occluding the aperture in the wing skin, the movement of the hinged panel being configured to accommodate movement of the movable member extending through the aperture.

The hinged panel may be hingedly connected to the wing skin.

The movable member may be configured to urge the hinged panel toward the open position.

The assembly may comprise a biasing member configured to resiliently bias the hinged panel toward the movable member.

The assembly may comprise a resilient biasing member connected to the hinged panel and to the movable member.

The assembly may comprise a biasing member configured to resiliently bias the hinged panel toward the closed position.

The assembly may comprise a seating surface for interfacing with the hinged panel when the hinged panel is in the closed position.

The seating surface may be configured to support the hinged panel at a position where an outer side of the hinged panel is substantially flush with the outer side of the wing skin.

The seating surface may be substantially flush with an inner side of the wing skin and extends into the aperture formed in the wing skin.

The movable member may comprise an anti-icing duct.

In another aspect, the disclosure describes an aircraft wing assembly comprising:

a fixed wing portion comprising a wing skin, the wing skin having a first aperture and a second aperture formed therein;

a leading edge slat movably connected to the fixed wing portion;

a slat track extending between the fixed wing portion and the leading edge slat, the slat track extending through the first aperture in the wing skin;

an anti-icing duct extending between the fixed wing portion and the leading edge slat, the anti-icing duct extending through the second aperture in the wing skin;

a substantially rigid panel movable at least partially across the first aperture formed in the wing skin for at least partially occluding the first aperture and for accommodating movement of the slat track extending through the first aperture; and a hinged panel configured to swing outwardly from an outer side of the wing skin toward an open position and to swing toward a closed position at least partially occluding the second aperture in the wing skin, the movement of the hinged panel being configured to accommodate movement of the anti-icing duct extending through the second aperture.

In another aspect, the disclosure describes and aircraft comprising an apparatus as disclosed herein.

In another aspect, the disclosure describes and aircraft comprising one or more of the movable panels disclosed herein.

In another aspect, the disclosure describes and aircraft comprising an assembly as disclosed herein.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure relates to apparatus for obstructing air flow through apertures in aircraft wing skins where movable members such as slat tracks or anti-icing ducts extend through such apertures. Also disclosed are aircraft wings comprising such apparatus. In some embodiments, the apparatus for obstructing air flow disclosed herein may, for example, be used in conjunction with anti-icing ducts that serve to deliver hot air to leading edge slats or other deployable aerodynamic devices of aircraft. In some embodiments, the apparatus for obstructing air flow disclosed herein may, for example, be used in conjunction with tracks that are part of actuation mechanisms that serve to direct the deployment and retraction of leading edge slats or other deployable aerodynamic devices of aircraft.

In some embodiments, the apparatus disclosed herein may improve flow characteristics around a wing of an aircraft and consequently improve the aerodynamic efficiency of the wing. For example, the apparatus may reduce leakage flow through the apertures from the high pressure lower wing surface to the low pressure upper wing surface. In some embodiments, the apparatus may have a relatively simple construction and may be relatively inexpensive to manufacture. In some embodiments, the apparatus may make efficient use of the limited amount of space available inside aircraft wings.

References made herein to "obstructing" air flow are intended to encompass partial obstruction of air flow so as to increase resistance to air flow and not necessarily a complete obstruction of air flow.

Aspects of various embodiments are described through reference to the drawings.

Figure 1:
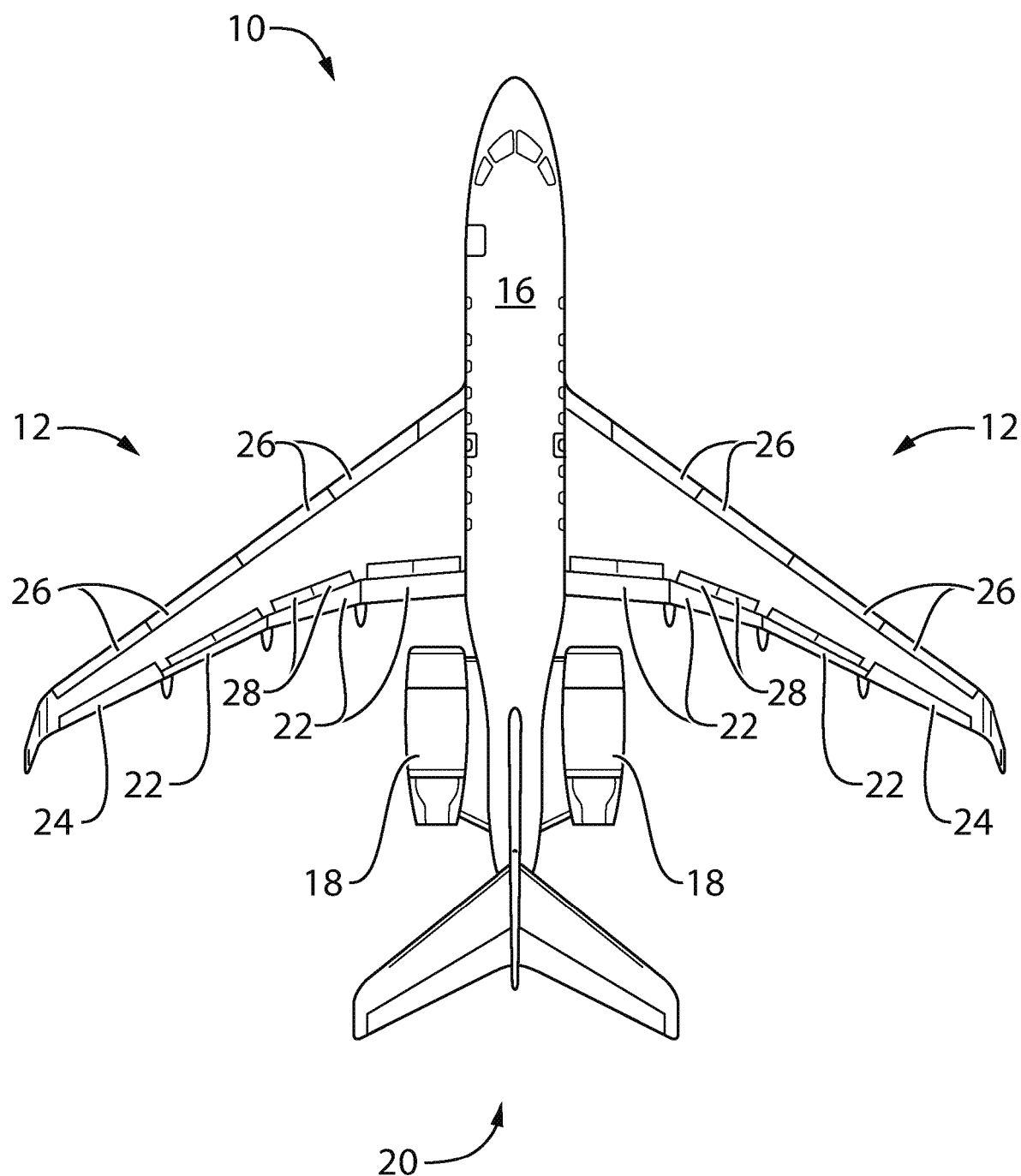
FIG. 1 is a top plan view of an exemplary aircraft including one or more apparatus for obstructing air flow through an aperture formed in a wing skin as disclosed herein.

FIG. 1 is a top plan view of an exemplary aircraft 10 which may comprise one or more apparatus for obstructing air flow through one or more respective apertures in a wing skin. Aircraft 10 may be any type of aircraft such as, for example, corporate, private, commercial, passenger aircraft suitable for civil aviation, or, unmanned aircraft. For example, aircraft 10 may be a narrow-body, twin-engine jet airliner. Aircraft 10 may be a fixed-wing aircraft. Aircraft 10 may comprise one or more wings 12, fuselage 16, one or more engines 18 and empennage 20. Each wing 12 of aircraft 10 may comprise an assembly of components including flow-obstructing apparatus as described below. Each wing 12 may comprise one or more aerodynamic devices such as trailing edge flap(s) 22, aileron(s) 24, leading edge slat(s) 26 and spoiler(s) 28.

Figure 2:
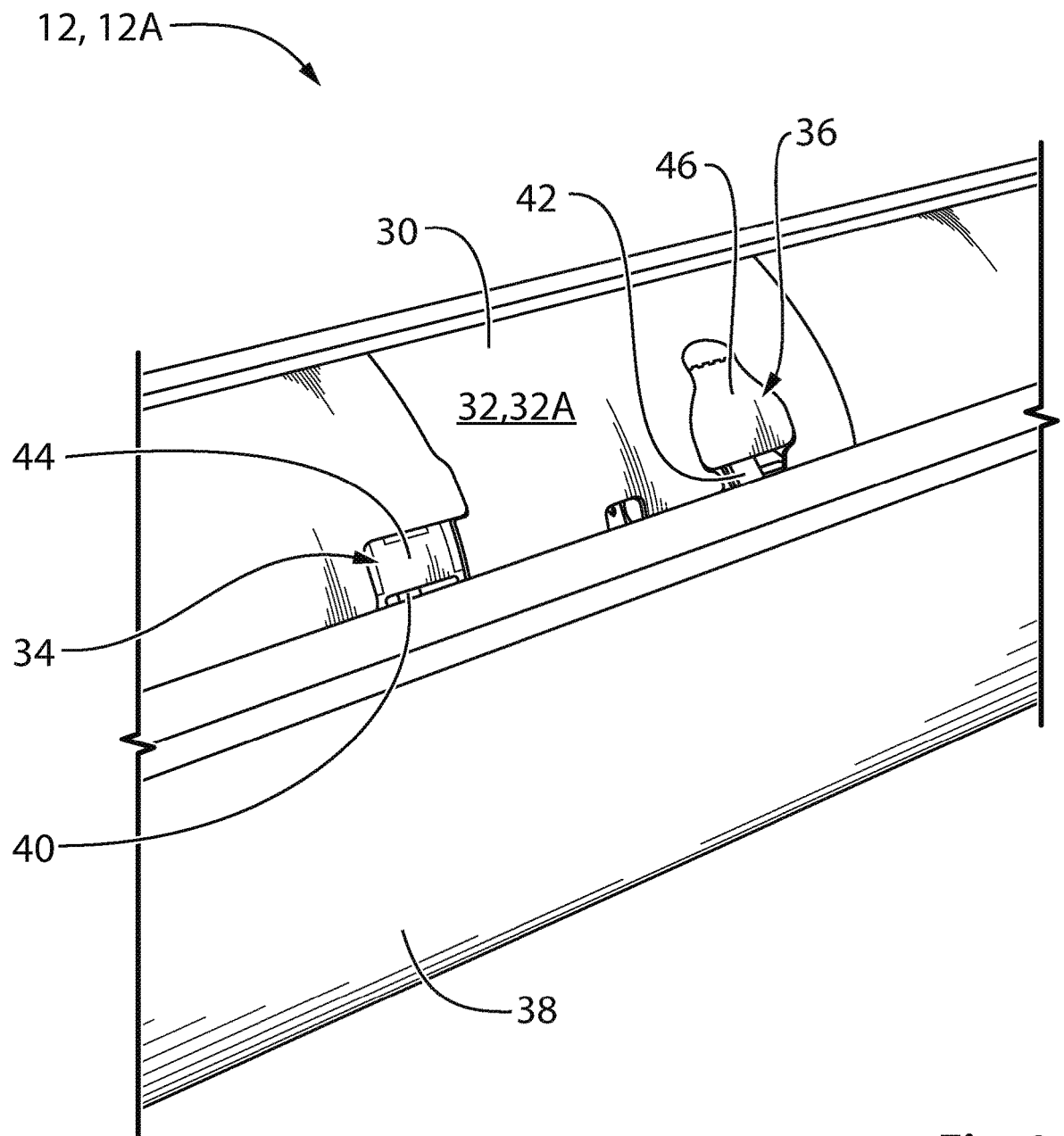
FIG. 2 is a perspective view of part of an exemplary leading edge of a wing of the aircraft of FIG. 1 showing the apparatus for obstructing air flow through apertures in the wing skin.

FIG. 2 is a perspective view of an exemplary leading edge 12A of wing 12 of aircraft 10. Wing 12 may comprise fixed wing portion 30 comprising wing skin 32. Wing skin 32 may define an aerodynamic surface and a cavity inside of fixed wing portion 30. The aerodynamic surface of wing skin 32 may be defined by outer side (surface) 32A of wing skin 32 which may be exposed to a stream of air around wing 12 during flight of aircraft 10. The internal cavity of fixed wing portion 30 may be defined at least in part by inner side (surface) 32B (shown in FIG. 5) of wing skin 32. Wing skin 32 may comprise one or more first apertures 34 and one or more second apertures 36 formed therein. Wing 12 may comprise leading edge slat 38 movably connected to fixed wing portion 30 via slat track 40 (shown more clearly in FIG. 3). Slat track 40 may extend between the cavity inside of fixed wing portion 30 and leading edge slat 38 and may be part of an actuation mechanism for leading edge slat 38. Slat track 40 may extend through first aperture 34 formed in wing skin 32. Slat track 40 may be fixedly connected to leading edge slat 38 and movably connected to fixed wing portion 30 so that when leading edge slat 38 is deployed or retracted, slat track 40 may correspondingly be deployed or retracted from fixed wing portion 30 via first aperture 34. Movement of slat track 40 through first aperture 34 may comprise longitudinal movement generally along slat track 40, and/or, some lateral and/or vertical movement within first aperture 34.

Anti-icing duct 42 (shown more clearly in FIG. 5) may extend between fixed wing portion 30 and leading edge slat 38. Anti-icing duct 42 may extend through second aperture 36 in wing skin 32. Anti-icing duct 42 of the type shown herein may also be known as a "T-duct" or "Telescoping duct". Second aperture 36 may permit anti-icing duct 42 to extend through skin 32 and between the cavity inside of fixed wing portion 30 and leading edge slat 38. Anti-icing duct 42 may be configured to accommodate movement of leading edge slat 38 relative to fixed wing portion 30. Movement of anti-icing duct 42 through second aperture 36 may comprise lateral and/or vertical movement within second aperture 36.

In order to accommodate the movement of slat track 40, the size of first aperture 34 may need to be larger than the outer cross-sectional profile of slat track 40. Similarly, in order to accommodate the movement of anti-icing duct 42, the size of first aperture 36 may need to be larger than the outer cross-sectional profile of anti-icing duct 42. Accordingly, without any corrective measure, the air passage defined by first aperture 34 around slat track 40 and the air passage defined by second aperture 36 around anti-icing duct 42 may cause undesirable flow characteristics around leading edge 12A of wing 12 due to leakage of air flow through apertures 34 and 36 from the high pressure lower wing surface to the low pressure upper wing surface. For example, such leakage flow could result in undesirable local flow separation, which could cause some loss of lift in that particular area of wing 12.

The specific configuration of fixed wing portion 30 and leading edge slat 38 illustrated herein is not intended to be limiting. For example, aspects of the present disclosure could be used in conjunction with tracks and/or anti-icing ducts that extend to other types of deployable aerodynamic devices of aircraft 10 that may require icing protection.

As explained in more detail below, wing 12 may comprise sliding panel 44 and hinged panel 46. Sliding panel 44 may be movable at least partially across first aperture 34 formed in wing skin 32 for at least partially occluding first aperture 34 and for accommodating movement of slat track 40 extending through first aperture 34. Hinged panel 46 may be configured to swing outwardly from outer side 32A of wing skin 32 toward an open position and to swing toward a closed position at least partially occluding the second aperture in wing skin 32. The movement of hinged panel 46 may be configured to accommodate movement of anti-icing duct 42 extending through second aperture 36. Even though hinged panel 46 is described herein as being used in conjunction with anti-icing duct 42 and sliding panel 44 is described herein as being used in conjunction with slat track 40, it is understood that hinged panel 46 and sliding panel 44 could be used with other types of movable members. For example, it is understood that in some embodiments, hinged panel 46 could be used in conjunction with slat track 40 and sliding panel 44 could be used in conjunction with anti-icing duct 42. However, in some situations, hinged panel 46 may be better suited for use with anti-icing duct 42 and sliding panel 44 may be better suited for use with slat track 40 for a more efficient use of space. The use of sliding panel 44 and/or hinged panel 46 may reduce the amount of leakage flow from the high pressure lower wing surface to the low pressure upper wing surface through apertures 34, 36 and thereby reduce the loss of lift associated with such leakage flow.

Figure 3:
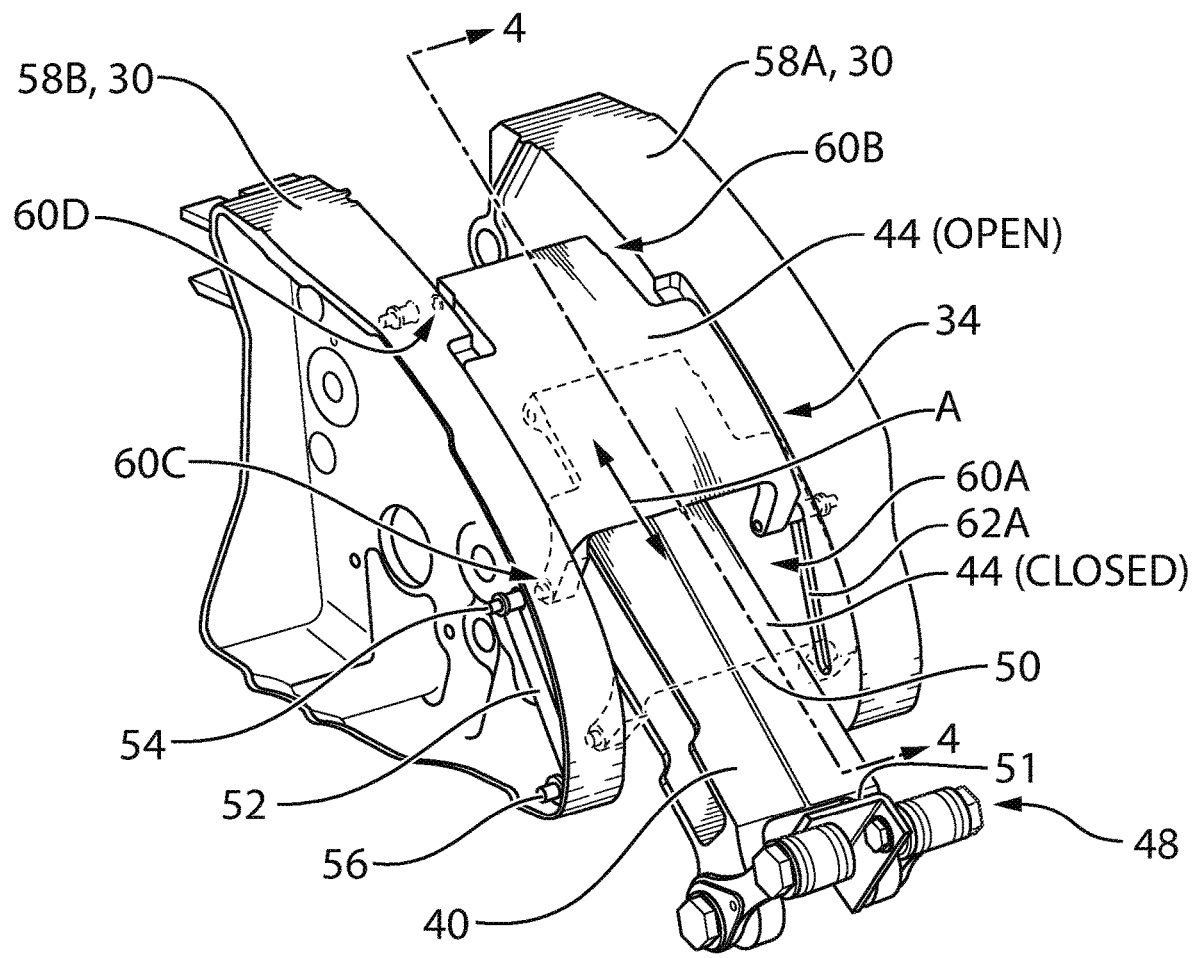
FIG. 3 is a perspective view showing a sliding panel for obstructing air flow through one of the apertures in the wing skin.

FIG. 3 is a perspective view showing sliding panel 44 for obstructing air flow through aperture 34 in wing skin 32 (not shown in FIG. 3). Sliding panel 44 is shown both in the open position in solid lines and in the closed position in stippled line. Movable slat track 40 may extend through aperture 34 formed in wing skin 32. Slat track 40 may extend between the fixed wing portion 30 and an aerodynamic device such as leading edge slat 38 (not shown in FIG. 3) movably connected to fixed wing portion 30. Slat track 40 may be fixedly connected (i.e., secured) to leading edge slat 38 via link 48 and may be movably connected to fixed wing portion 30 according to known or other suitable means.

Sliding panel 44 may be substantially rigid so that it may not undergo significant deflection during normal use as it is moved between the open and closed positions. For example, sliding panel 44 may be made of a metallic (e.g., aluminum alloy) or composite material (e.g., carbon composite) suitable for use on wing 12 of aircraft 10. Sliding panel 44 may be movable at least partially across first aperture 34 formed in wing skin 32 for at least partially occluding first aperture 34 and also for accommodating movement of slat track 40 extending through first aperture 34. As illustrated in FIG. 3, the movement of sliding panel 44 may be generally along arrow "A". The movement of sliding panel 44 may comprise mostly translation so that each part of sliding panel 44 may displaced by a similar amount but sliding panel 44 may undergo some rotation as well in some embodiments. Accordingly, the movement of sliding panel 44 between the open and closed positions across of first aperture 34 may be characterized as a sliding movement. The open position of sliding panel 44 may correspond to a position of slat track 40 associated with leading edge slat 38 being retracted, and, the closed position of sliding panel 44 may correspond to a position of slat track 40 associated with leading edges slat 38 being deployed.

Sliding panel 44 may comprise panel interfacing surface 50 for contacting a counterpart track interfacing surface 51 movable with slat track 40 and permitting the movement of slat track 40 to urge rigid panel 44 toward the open position as slat track 40 is translated upwardly and/or inwardly within first aperture 34. In various embodiments, track interfacing surface 51 may be part of slat track 40 or may comprise a separate component secured to slat track 40 so as to be movable with slat track 40. Biasing member 52 may be configured to partially resist the urging of sliding panel 44 by slat track 40. Biasing member 52 may, for example, comprise a tension (e.g., coil) spring, a constant force spring or any suitable means for resiliently biasing sliding panel 44 toward the closed position. Accordingly, biasing member 52 may urge (e.g., pull or push) sliding panel 44 toward the closed position as slat track 40 moves downwardly in relation to FIG. 3. Biasing member 52 may be connected to sliding panel 44 at attachment point 54 and may be connected to structural rib 58B of fixed wing portion 30 at attachment point 56. It is understood that another biasing member 52 may be connected to the other (opposite) side of sliding panel 44 and to structural rib 58A in the same manner. Structural rib 58A may be adjacent a first lateral (e.g., right) side of sliding panel 44 and structural rib 58B may be adjacent a second lateral (e.g., left) side of sliding panel 44. In some embodiments, structural rib 58A and structural rib 58B may be substantially parallel. The use of two biasing members 52 connected to opposite sides of sliding panel 44 may provide redundancy and may also exert a more even biasing force onto sliding panel 44 that is less susceptible to cause binding. The motion path of sliding panel 44 along arrow A may be substantially parallel to the structural ribs 58A and/or 58B.

Figure 4:
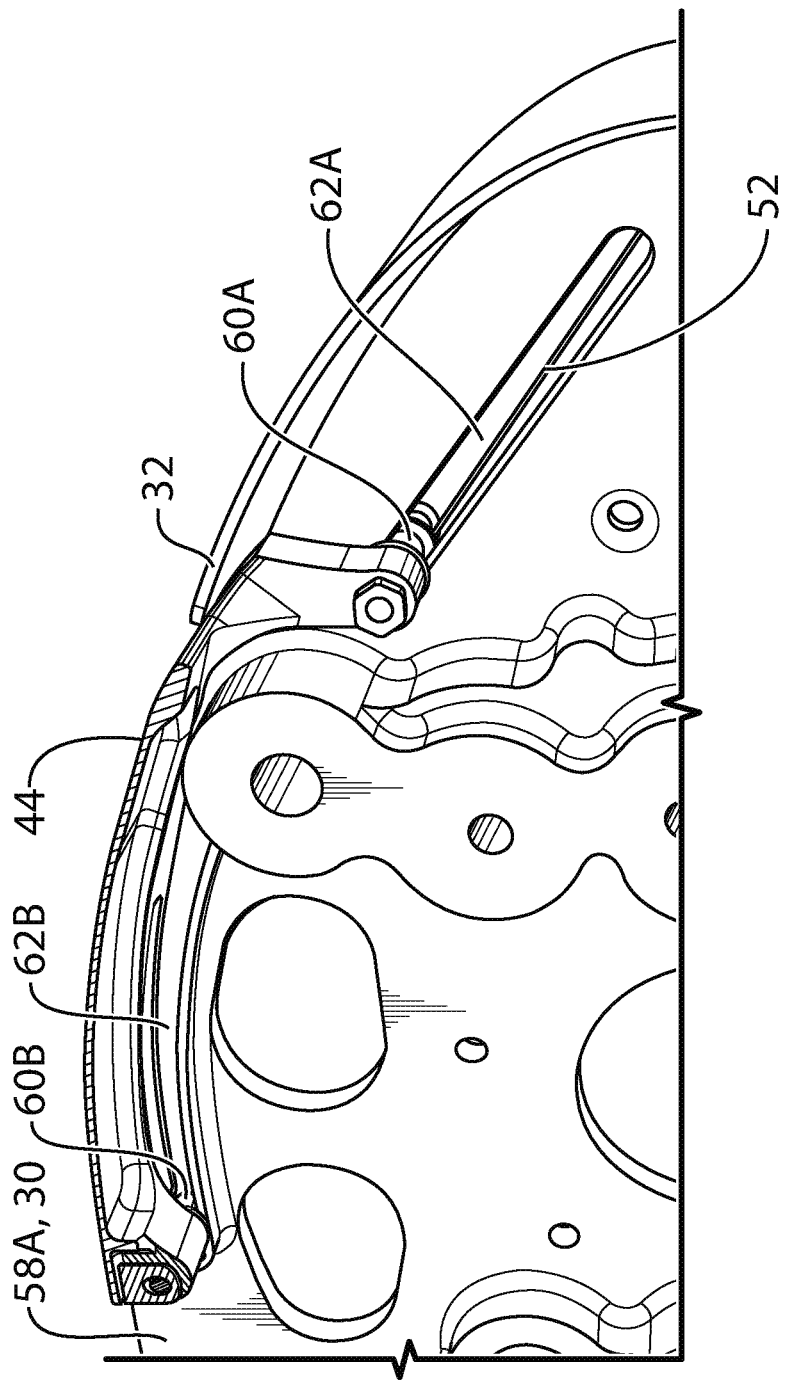
FIG. 4 is a perspective cross-sectional view of the sliding panel of FIG. 3 taken along line 4-4 shown in FIG. 3.

FIG. 4 is a perspective cross-sectional view of sliding panel 44 taken along line 4-4 of FIG. 3. FIG. 4 also shows a side of structural rib 58A of fixed wing portion 30. Structural ribs 58A, 58B may be forming elements of the structure of fixed wing portion 30. In some embodiments, structural ribs 58A, 58B may be oriented generally transversely to a spar of wing 12. In some embodiments, structural ribs 58A, 58B may be substantially perpendicular to a spar of wing 12.

One or more guides 60A-60D may be attached to sliding panel 44. Guides 60A-60B may be configured to engage respective tracks 62A-62D configured to direct the movement of sliding panel 44. Tracks 62A and 62B may be disposed on structural rib 58A and tracks 62C and 62D may be disposed on structural rib 58B. Track 62C and 62D are not illustrated in FIG. 4 but it is understood that track 62C would mirror track 62A and that track 62D would mirror track 62B. In some embodiments, one or more of tracks 62A-62D may comprise slots formed into or on structural ribs 58A and 58B. For example, track 62A may comprise a slot formed into a side wall of structural rib 58A and track 62B may comprise a slot that is raised relative to the side wall of structural rib 58A. It is understood that tracks 62A-62D are not limited to slots but could include any suitable means (e.g., rail) along which guides 60A-60D may be directed for the purpose of guiding the movement of sliding panel 44. Accordingly, guides 60A-60D may include roller guides, roller followers, guide pins, sliding pads, or any suitable means for engaging with tracks 62A-62D.

In some embodiments, a path defined by track 62A (and 62C—not shown) may be substantially linear. In some embodiments, a path defined by track 62B (and 62D—not shown) may be non-linear. For example a path defined by track 62B (and 62D—not shown) may be substantially arcuate. In some embodiments, track 62B may be disposed aft of the track 62A relative to the first rib and wing 12. Similarly, track 62D (not shown) may be disposed aft of track 62C on structural rib 58B. Guides 60B and 60D may be disposed aft of guides 60A and 60C (not shown) so that tracks 62A and 62C (not shown) may direct the movement of a forward portion of sliding panel 44 and tracks 623 and 62D (not shown) may direct the movement of an aft portion of sliding panel 44. Accordingly, due to the non-linear path defined by track 62B and track 62D (not shown) and to the substantially linear path defined by track 62A and track 62C (not shown), sliding panel 44 may undergo (e.g., mainly) translation and some rotation as well. For example, in some embodiments, track 62B and track 62D may be configured to cause lowering of sliding panel 44 into the internal cavity of fixed wing portion 30 so that sliding panel 44 may become stowed underneath the portion of wing skin 32 that is directly above first aperture 34 when sliding panel 44 is moved to the open position.

Figure 5:
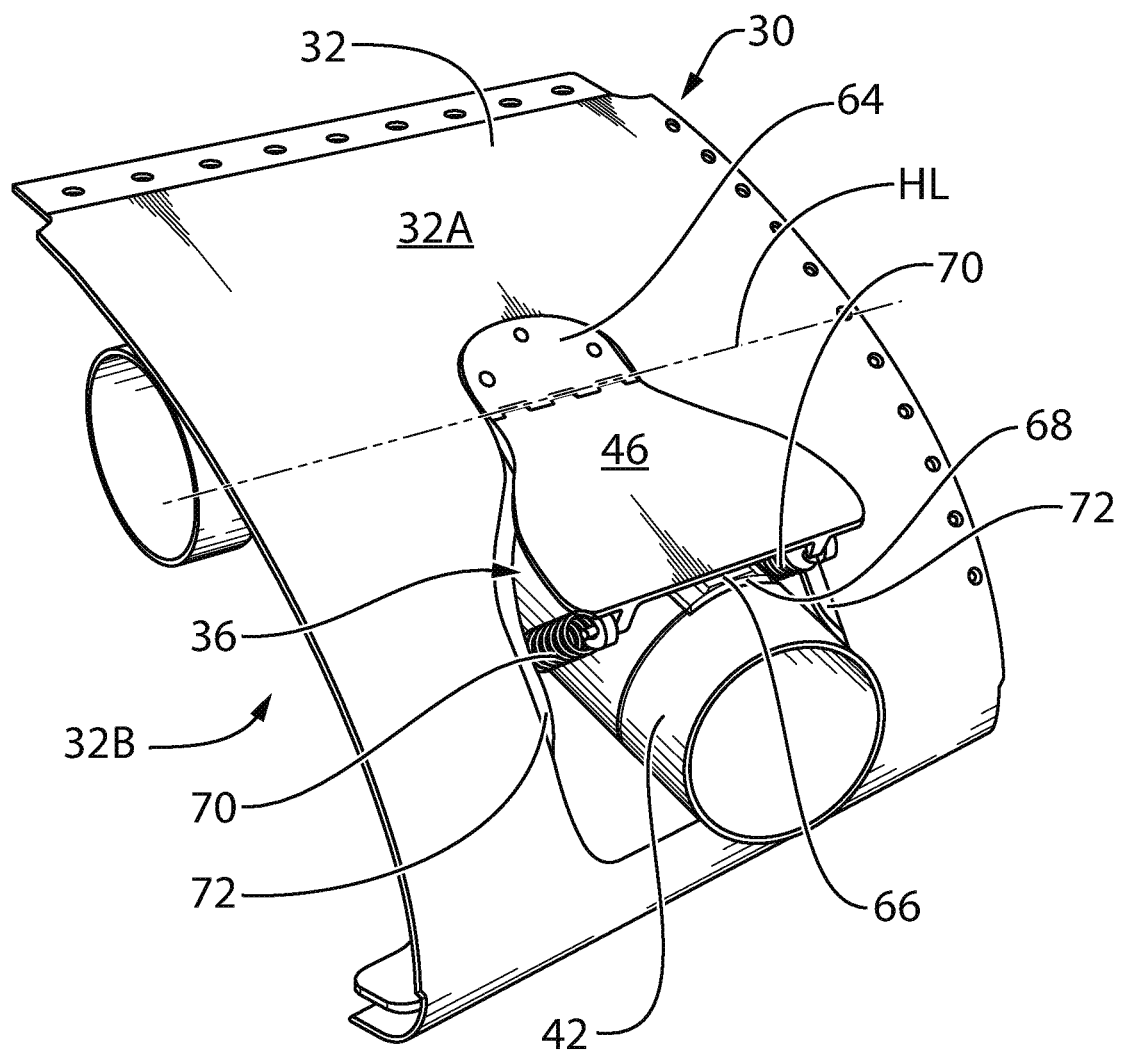
FIG. 5 is a perspective view showing a hinged panel for obstructing air flow through another of the apertures in the wing skin.

FIG. 5 is a perspective view of hinged panel 46 for obstructing air flow through aperture 36 in wing skin 32. Hinged panel 46 may be substantially rigid so that it may not undergo significant deflection during normal use as it is moved (e.g., swung) between the open and closed positions.

For example, hinged panel 46 may be made of a metallic (e.g., aluminum alloy) or composite material (e.g., carbon composite) suitable for use on wing 12 of aircraft 10. FIG. 5 shows hinged panel 46 in the open position as being swung outwardly from outer side 32A of wing skin 32 to accommodate movement of anti-icing duct 42 extending through aperture 42. In other words, the open position of hinged panel 46 may include part of hinged panel 46 being displaced into the air stream to which outer side 32A of skin 32 may be exposed. Movable anti-icing duct 42 may extend through aperture 36 formed in wing skin 32. Anti-icing duct 42 may extend between fixed wing portion 30 and an aerodynamic device such as leading edge slat 38 (not shown in FIG. 5) movably connected to fixed wing portion 30. Anti-icing duct 42 may be connected to fixed wing portion 30 and leading edge slat 38 according to known or other suitable means.

In some embodiments, hinged panel 46 may be directly or indirectly hingedly connected to wing skin 32 via tab 64 and suitable fasteners. Tab 64 and hinged panel 46 may be hingedly connected together. Accordingly, hinged panel 46 may be movable (i.e., pivotable) about hinge line HL. In some embodiments, hinge line HL may be oriented transversely (e.g., perpendicular) to anti-icing duct 42. In some embodiments, hinge line HL may be oriented generally parallel to a leading edge of wing 12.

In some embodiments, anti-icing duct 42 may be configured to urge hinged panel 46 toward the open position. For example, hinged panel 46 may comprise inner interfacing surface 66 for contacting interfacing pad 68 of anti-icing duct 42 and permitting anti-icing duct 42 to urge hinged panel 46 toward the open position as anti-icing duct 42 moves vertically upwardly within aperture 36 relative to wing 12.

One or more biasing members 70 (referred hereinafter in the singular) configured to resiliently bias hinged panel 46 may be provided. In various embodiments, biasing member 70 may, for example, comprise a tension (e.g., coil) spring, a constant force spring or any suitable means for resiliently biasing hinged panel 46. In some embodiments, biasing member 70 may be interconnected between hinged panel 46 and anti-icing duct 42 in order to resiliently bias hinged panel 46 toward anti-icing duct 42. In some embodiments, biasing member 70 may be configured to resiliently bias hinged panel 46 toward a closed position of hinged panel 46.

One or more seating surfaces 72 (referred hereinafter in the singular) for interfacing with hinged panel 46 when hinged panel 46 is in the closed position may be provided. Seating surface 72 may be configured to support hinged panel 46 at its closed position where an outer side of hinged panel 46 may be substantially flush (see FIG. 6B) with outer side 32A of wing skin 32. Seating surface 72 may be in the form of a flange secured to an inner side 32B of wing skin 32 and extending (e.g., radially inwardly) into second aperture 36 formed in wing skin 32. For example, seating surface 72 may be substantially flush with inner side 32B of wing skin 32 and extend into second aperture 36 formed in wing skin 32.

Figure 6A:
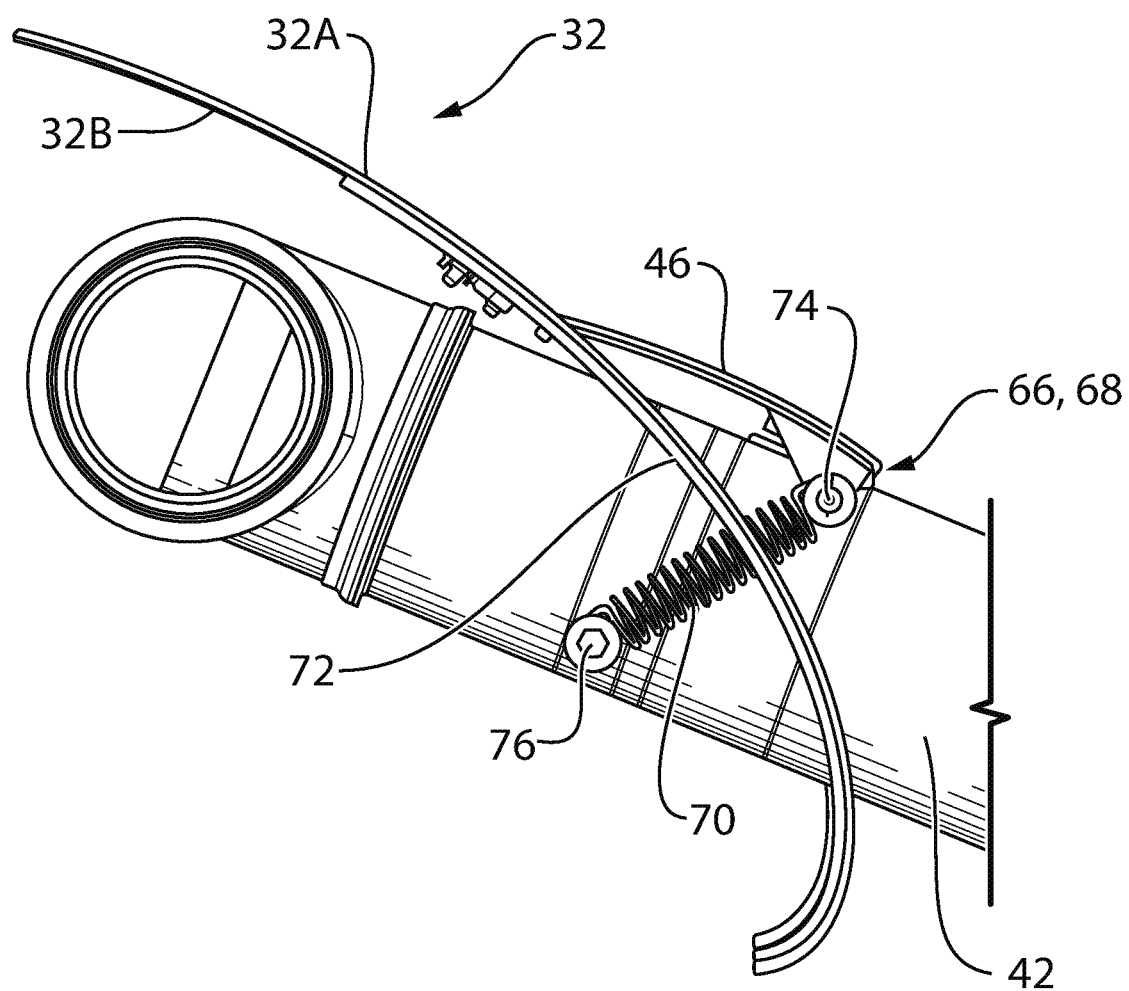
FIG. 6A is a side elevation view showing the hinged panel of FIG. 5 in an open position.

FIG. 6A is a side elevation view showing hinged panel 46 in the open position where it is swung outwardly from outer side 32A of wing skin 32. The open position of hinged panel 46 may correspond to a position of anti-icing duct 42 associated with leading edge slat 38 being retracted. Biasing member 70 may urge (e.g., pull or push) hinged panel 46 toward (e.g., against) anti-icing duct 42 when in the open position. Biasing member 70 may be connected to hinged panel 46 at attachment point 74 and may be connected to anti-icing duct 42 at attachment point 76. Biasing member 70 may be selected to provide a sufficient biasing force to overcome expected aerodynamic forces on hinged panel 46 so as to prevent flutter of hinged panel 46 and also hold hinged panel 46 against anti-icing duct 42 during flight. It is understood that another biasing member 70 may be similarly or identically connected on the other (opposite) side of hinged panel 46. In some embodiments, two or more biasing members 70 may be provided for redundancy.

Figure 6B:
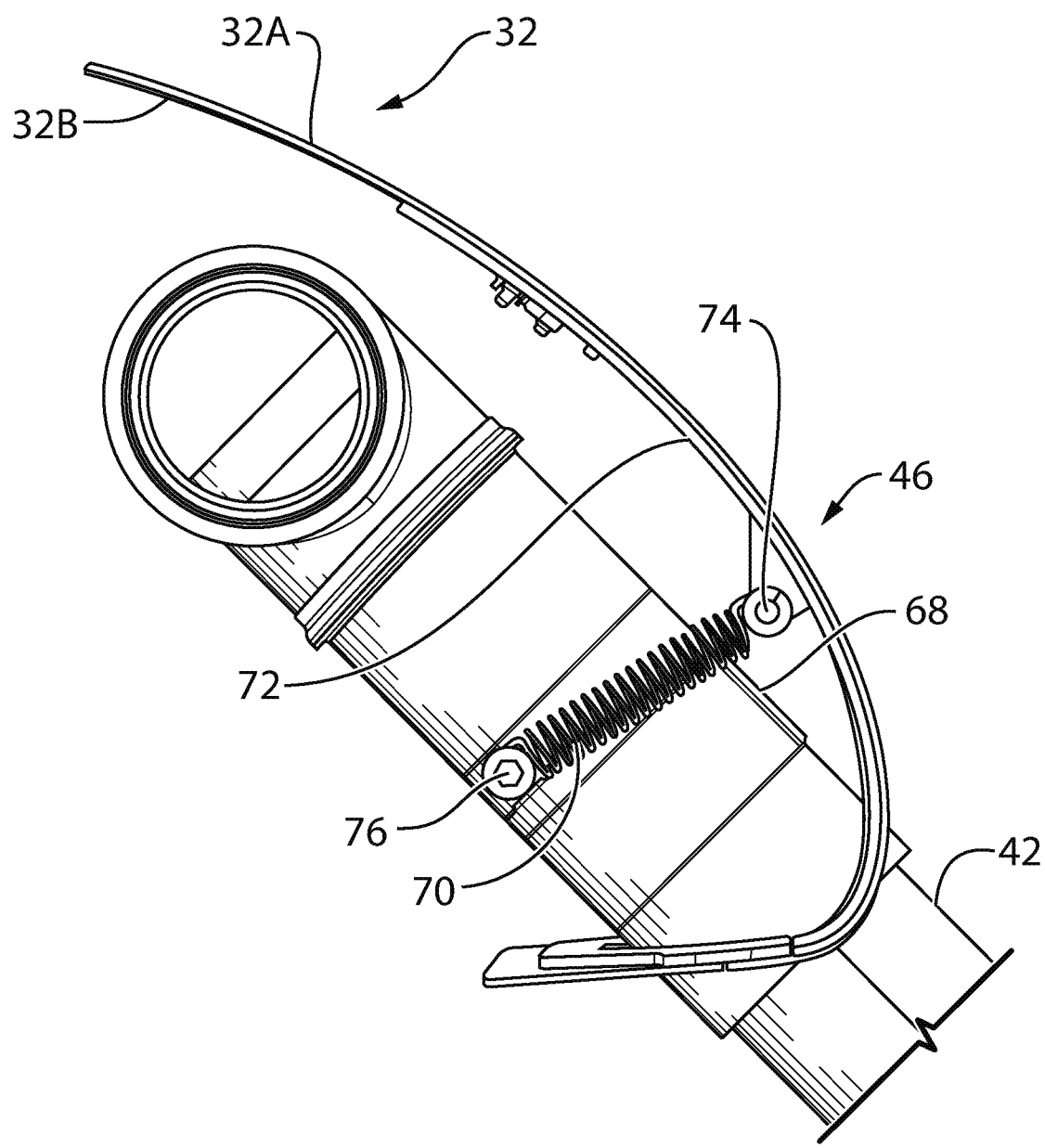
FIG. 6B is a side elevation view showing the hinged panel of FIG. 5 in a closed position.

FIG. 6B is a side elevation view showing hinged panel 46 in the closed position where it is swung inwardly toward wing skin 32 relative to the open position shown in FIG. 6A. The closed position of hinged panel 46 may correspond to a position of anti-icing duct 42 associated with leading edge slat 38 being deployed so that hinged panel 46 may at least partially occlude second aperture 36 in wing skin 32. As shown in FIG. 6B an outer side of hinged panel 46 may be substantially flush with outer side 32A of wing skin 32 when hinged panel 46 is in the closed position. In some embodiments, interface pad 68 of anti-icing duct 42 may not necessarily be in direct contact with hinged panel 46 but biasing member 70 may nevertheless urge hinged panel 46 toward (e.g., against) seating surface 72 when in hinged panel 46 is in the closed position.

In various embodiments, the aircraft wing assemblies disclosed herein may comprise one or more sliding panels 44 or one or more hinged panels 46. In some embodiments, the aircraft wing assemblies disclosed herein may comprise one or more sliding panels 44 and one or more hinged panels 46 in combination. It is understood that aspects of sliding panel 44 and of hinged panel 46 disclosed above would be equally applicable to such combination. For example, in some embodiments an aircraft wing assembly according to the present disclosure may comprise:

fixed wing portion 30 comprising wing skin 32 where wing skin 32 has first aperture 34 and second aperture 36 formed therein;

leading edge slat 38 movably connected to fixed wing portion 30;

slat track 40 extending between fixed wing portion 30 and leading edge slat 38 and through first aperture 34 in wing skin 32;

anti-icing duct 42 extending between fixed wing portion 32 and leading edge slat 38 and through second aperture 36 in wing skin 32;

rigid sliding panel 44 movable at least partially across first aperture 34 formed in wing skin 32 for at least partially occluding first aperture 34 and for accommodating movement of slat track 40 extending through first aperture 34; and hinged panel 46 configured to swing outwardly from outer side 32A of wing skin 32 toward an open position and to swing toward a closed position at least partially occluding second aperture 36 in wing skin 32 where the movement of hinged panel 46 is configured to accommodate movement of anti-icing duct 42 extending through second aperture 36.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the systems, apparatus, assemblies and aircraft disclosed and shown herein may comprise a specific number of elements/components, the systems, apparatus, assemblies and aircraft could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An apparatus for obstructing air flow through an aperture in an aircraft wing skin where a movable member extends through the aperture, the apparatus comprising:
a rigid panel configured to be movable at least partially across the aperture for at least partially occluding the aperture and for accommodating movement of the movable member extending through the aperture;
a first guide attached to the rigid panel and configured to engage a first track configured to direct a movement of the rigid panel at least partially across the aperture; and
an interfacing surface for contacting the movable member and permitting the movable member to urge the rigid panel toward an open position.

2. The apparatus as defined in claim 1, comprising a biasing member configured to partially resist the urging of the rigid panel by the movable member.

3. The apparatus as defined in claim 1, comprising a biasing member configured to resiliently bias the rigid panel toward a closed position.

4. The apparatus as defined in claim 1, comprising a second guide attached to the rigid panel and configured to engage a second track configured to direct the movement of the rigid panel at least partially across the aperture.

5. An aircraft comprising the apparatus as defined in claim 1.

6. An aircraft wing assembly comprising:
a fixed wing portion comprising a wing skin, the wing skin having an aperture formed therein;
a movable member extending through the aperture formed in the wing skin, the movable member extending between the fixed wing portion and an aerodynamic device movably connected to the fixed wing portion;
a rigid panel movable at least partially across the aperture formed in the wing skin for at least partially occluding the aperture and for accommodating movement of the movable member extending through the aperture;
a first guide attached to the rigid panel; and
a first track for directing a movement of the rigid panel at least partially across the aperture, the first track being engaged with the first guide,
wherein the movable member is configured to urge the rigid panel toward an open position.

7. The assembly as defined in claim 6, wherein:
the fixed wing portion comprises a first rib adjacent the rigid panel; and
a motion path of the rigid panel is parallel to the first rib.

8. The assembly as defined in claim 7, wherein the first track is disposed on the first rib of the fixed wing portion.

9. The assembly as defined in claim 8, wherein the first track comprises a first slot.

10. The assembly as defined in claim 7 comprising:
a second guide attached to the rigid panel; and
a second track for directing the movement of the rigid panel at least partially across the aperture, the first track being engaged with the second guide and being disposed on the first rib of the fixed wing portion.

11. The assembly as defined in claim 10, wherein the second track comprises a second slot.

12. The assembly as defined in claim 10 wherein a path defined by the second track is non-linear.

13. The assembly as defined in claim 10, wherein a path defined by the second track is arcuate.

14. The assembly as defined in claim 10, wherein the second track is disposed aft of the first track relative to the first rib.

15. The assembly as defined in claim 7, wherein:
the first rib is adjacent a first side of the rigid panel; and
the fixed wing portion comprises a second rib adjacent a second side of the rigid panel that is laterally opposite the first side of the rigid panel, the second rib being parallel to the first rib.

16. The assembly as defined in claim 15, comprising:
a third guide attached to the rigid panel and engaged with a third track; and
a fourth guide attached to the rigid panel and engaged with a fourth track, the third track and the fourth track being disposed on the second rib of the fixed wing portion.

17. The assembly as defined in claim 16, wherein the third track comprises a third slot and the fourth track comprises a fourth slot.

18. The assembly as defined in claim 16, wherein a path defined by the third track is linear and a path defined by the fourth track is non-linear.

19. The assembly as defined in claim 16, wherein the fourth track is disposed aft of the third track relative to the second rib.

20. The assembly as defined in claim 6, wherein a path defined by the first track is linear.

21. The assembly as defined in claim 6, comprising a biasing member configured to partially resist the urging of the rigid panel by the movable member.

22. The assembly as defined in claim 6, comprising a biasing member configured to resiliently bias the rigid panel toward a closed position.

23. The assembly as defined in claim 6, wherein the movable member comprises a slat track.

24. An aircraft comprising the assembly as defined in claim 6.

* * * * *